(12) United States Patent
Stewart

(10) Patent No.: US 11,562,329 B1
(45) Date of Patent: Jan. 24, 2023

(54) APPARATUS AND METHODS FOR SCREENING USERS

(71) Applicant: MY JOB MATCHER, INC., Austin, TX (US)

(72) Inventor: Arran Stewart, Austin, TX (US)

(73) Assignee: MY JOB MATCHER, INC., Austin, TX (US)

( * ) Notice: Subject to any disclaimer, the term of this patent is extended or adjusted under 35 U.S.C. 154(b) by 0 days.

(21) Appl. No.: 17/690,472

(22) Filed: Mar. 9, 2022

(51) Int. Cl.
*G06Q 10/10* (2012.01)

(52) U.S. Cl.
CPC ............................... *G06Q 10/1053* (2013.01)

(58) Field of Classification Search
None
See application file for complete search history.

(56) References Cited

U.S. PATENT DOCUMENTS

| | | | |
|---|---|---|---|
| 9,866,693 B2 | 1/2018 | Tamblyn | |
| 9,912,810 B2 | 3/2018 | Segre | |
| 10,318,926 B2 | 6/2019 | Champaneria | |
| 10,318,927 B2 | 6/2019 | Champaneria | |
| 10,693,872 B1 | 6/2020 | Larson | |
| 10,937,446 B1 * | 3/2021 | Wong | G06Q 10/1053 |
| 11,128,579 B2 | 9/2021 | Magliozzi | |
| 2012/0221477 A1 * | 8/2012 | Pande | G06Q 10/1053 705/321 |
| 2013/0346332 A1 * | 12/2013 | Schalk | G06Q 10/1053 705/321 |
| 2015/0046357 A1 * | 2/2015 | Danson | G06Q 10/1053 705/321 |
| 2017/0308807 A1 * | 10/2017 | Hauth | G06F 16/24578 |
| 2018/0121879 A1 * | 5/2018 | Zhang | G06Q 10/1053 |
| 2018/0150739 A1 * | 5/2018 | Wu | G06N 20/10 |
| 2018/0174020 A1 * | 6/2018 | Wu | G06N 3/0445 |
| 2018/0336528 A1 | 11/2018 | Carpenter | |

(Continued)

FOREIGN PATENT DOCUMENTS

| | | |
|---|---|---|
| CA | 3028205 | 12/2018 |
| KR | 1020180113150 | 10/2018 |
| WO | 2020111532 | 6/2020 |

OTHER PUBLICATIONS

S. Mhadgut, N. Koppikar, N. Chouhan, P. Dharadharand P. Mehta, "vRecruit: An Automated Smart Recruitment Webapp using Machine Learning," 2022 International Conference on Innovative Trends in Information Technology (ICITIIT), 2022, pp. 1-6, doi: 10.1109/ICITIIT54346.2022.9744135. (Year: 2022).*

(Continued)

*Primary Examiner* — Laura Yesildag
(74) *Attorney, Agent, or Firm* — Caldwell Intellectual Property Law

(57) ABSTRACT

An apparatus for screening users. The apparatus includes a processor communicatively connected to a user device and a memory communicatively connected to the processor. The memory contains instructions configuring the processor to receive verbal communication associated with a user and parse, using a chatbot, at least a user characteristic from the verbal communication. The processor also screens the user as a function of the user characteristic. Screening the user includes generating a compatibility score based on a compatibility of the at least a user characteristic and a posting and determining a confidence score wherein the confidence score comprises a quantitative value reflecting a confidence in the screening.

18 Claims, 8 Drawing Sheets

(56) References Cited

U.S. PATENT DOCUMENTS

| | | | |
|---|---|---|---|
| 2019/0019160 A1* | 1/2019 | Champaneria | G06F 40/295 |
| 2020/0302263 A1 | 3/2020 | Douek | |
| 2020/0184422 A1 | 6/2020 | Mondal | |
| 2020/0193382 A1 | 6/2020 | Michaels | |
| 2020/0302397 A1* | 9/2020 | Mathiesen | G06Q 10/1053 |
| 2020/0327505 A1 | 10/2020 | Gomes | |
| 2020/0394538 A1 | 12/2020 | Sethre | |
| 2021/0073737 A1 | 3/2021 | Flynn | |
| 2021/0150485 A1 | 5/2021 | Ghosh | |
| 2021/0182798 A1* | 6/2021 | Bikumala | G06F 16/951 |
| 2021/0233031 A1* | 7/2021 | Preuss | G06V 40/16 |
| 2021/0264372 A1 | 8/2021 | Asseer | |
| 2021/0279668 A1 | 9/2021 | Mikhajlov | |
| 2021/0304150 A1 | 9/2021 | Bezawada | |
| 2021/0312399 A1* | 10/2021 | Asokan | G10L 25/63 |
| 2021/0326747 A1* | 10/2021 | Shi | G06N 3/0454 |
| 2022/0004995 A1 | 1/2022 | Pachori | |
| 2022/0092548 A1* | 3/2022 | Olshansky | H04N 7/144 |
| 2022/0198399 A1* | 6/2022 | Sharma | G06Q 10/1053 |

OTHER PUBLICATIONS

R. G. Vishruth, R. Sunitha, K. S. Varuna, et al."Resume Scanning and Emotion Recognition System based on Machine Learning Algorithms," 2020 4th International Conference on Electronics, Communication and Aerospace Technology (ICECA), 2020, pp. 1127-1132, doi: 10.1109/ICECA493 (Year: 2020).*

R. G. Vishruth, R. Sunitha, K. S. Varuna, N. Varshini and P. B. Honnavalli, "Resume Scanning and Emotion Recognition System based on Machine Learning Algorithms," 2020 4th International Conference on Electronics, Communication and Aerospace Technology (I CECA), 2020, pp. 1127-1132, doi:10.1109/ICECA49 (Year: 2020).*

L. Chen, R. Zhao, C. W. Leong, B. Lehman, G. Feng and M. E. Hoque, "Automated video interview judgment on a large-sized corpus collected online," 2017 Seventh International Conference on Affective Computing and Intelligent Interaction (ACII), 2017, pp. 504-509, doi: 10.1109/ACII.2017.8273646. (Year: 2017).*

Z. Elgammal, A. Barmu, H. Hassan, K. Elgammal, T. Özyerand R. Alhajj, "Matching Applicants with Positions for Better Allocation of Employees in the Job Market," 2021 22nd International Arab Conference on Information Technology (ACIT), 2021, pp. 1-5, doi: 10.1109/ACIT53391.2021.9677374. (Year: 2021).*

Artificial Intelligence Candidate Recruitment System using Software as a Service (SaaS) Architecture; Mishra, Divyanshi, and Sushant Shekhar 2018.

Hr based interactive chat bot (powerbot); Tadvi, Shabana, Sultanat Rangari, and Ammar ROHE;2020.

How AI-based HR Chatbots are Simplifying Pre-screening; Singh, Megha; Sep. 9, 2019.

A How-To Guide For Using A Recruitment Chatbot; 2022; IDEAL. COM.

How AI Interviewing is Redefining the Way we Hire; blog.talview. com; Jun. 25, 2019.

* cited by examiner

APPARATUS AND METHODS FOR SCREENING USERS

FIELD OF THE INVENTION

The present invention generally relates to the field of parsing communications. In particular, the present invention is directed to an apparatus and methods for screening users.

BACKGROUND

Screening users for compatibility with postings can be labor intensive. However, automating this process is difficult due to the nuances and complexities related to determining a compatibility with postings.

SUMMARY OF THE DISCLOSURE

In an aspect of the present disclosure is an apparatus for screening users, the apparatus including at least a processor communicatively connected to a user device; and a memory communicatively connected to the processor, the memory containing instructions configuring the at least a processor to receive verbal communication associated with a user; parse, using a chatbot, at least a user characteristic from the verbal communication; screen the user as a function of the user characteristic, wherein screening includes: generating a compatibility score based on a compatibility of the at least a user characteristic and a posting, and determining a confidence score, wherein the confidence score comprises a quantitative value reflecting a confidence in the screening.

In another aspect of the present disclosure is a method for screening users, the method including: receiving, at a processor, verbal communication associated with a user; parsing, by the processor using a chatbot, at least a user characteristic from the verbal communication; screening, by the processor, the user as a function of the user characteristic, wherein screening includes: generating, by the processor, a compatibility score based on a compatibility of the at least a user characteristic and a posting; and determining, by the processor, a confidence score, wherein the confidence score comprises a quantitative value reflecting a confidence in the screening.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
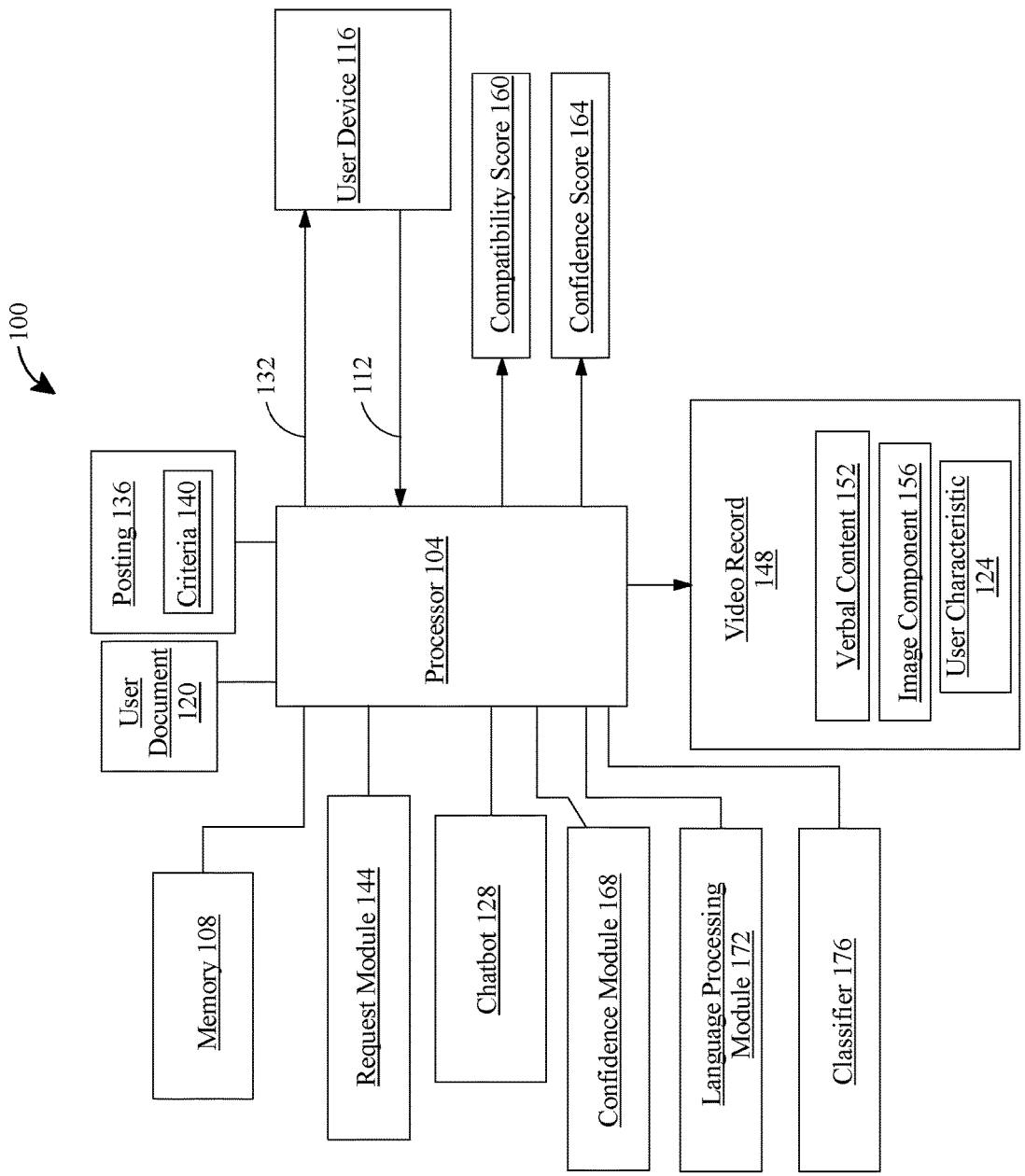
FIG. 1 is a block diagram of an embodiment of an apparatus for screening users.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for screening users. In an embodiment, an apparatus includes a processor communicatively connected to a user device and a memory communicatively connected to the processor. The memory contains instructions configuring the processor to receive verbal communication associated with a user and parse, using a chatbot, at least a user characteristic from the verbal communication. The processor also screens the user as a function of the user characteristic. Screening the user includes generating a compatibility score based on a compatibility of the at least a user characteristic and a posting and determining a confidence score wherein the confidence score comprises a quantitative value reflecting a confidence in the screening. Exemplary embodiments illustrating aspects of the present disclosure are described below in the context of several specific examples.

In an embodiment, methods and systems described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

A "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof, for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof, for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

In some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Now referring to FIG. 1, an apparatus for screening users is illustrated. Apparatus 100 includes a processor 104. Screening users, as discussed in this disclosure, may be an automated process executed by processor 104. Screening may include determining whether one or more prospective employees may be suitable candidates for employment for a specific job position, a group of job positions, and/or in general. Screening may be performed at anytime during an employer's search for candidates. In some embodiments, screening may be performed early in an application process, such as before a prospective employee interviews with a hiring manager. Screening may be a prerequisite for prospective employees to apply for a position. Processor 104 may include any computing device as described in this disclosure, including without limitation a microcontroller, microprocessor, graphical user interface (GUI), digital signal processor (DSP) and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus 100 and/or computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing. Apparatus 100 may include a memory 108. Memory 108 may be communicatively connected to processor 104 and may be configured to store information and/or datum related to apparatus 100. In one or more embodiments, memory 108 may be communicatively connected to a processor and configured to contain instructions configuring processor to execute any operations discussed in this disclosure. In one or more embodiments, memory 108 may include a storage device, as described further in this disclosure below.

Still referring to FIG. 1, processor 104 is configured to receive a verbal communication 112 associated with a user. As used in this disclosure, a "verbal communication" is information and/or data that is transmitted to a processor from another device, such as a user device 116, and includes verbal content. Verbal communication 112 may typically be from user, although processor 104 may receive the verbal communication 112 from another party or device. As used in this disclosure, "verbal content" is comprehensible language-based communication including oral communication and written communication. Processor 104 may be communicatively connected to a user device 116. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

As used in this disclosure, a "user device" is a computing device controlled and/or operated by a user. Computing device may be any computing device described in this disclosure, such as a processor communicatively connected to a memory. User device 116 may be a personal computer such as a desktop, laptop, smart phone, and/or the like. Processor 104 may be configured to require credentials from user device 116, such as a username and a password, to verify the identity of user. Processor 104 may send verification to user, such as an email to user's email address and/or a text message to user's phone saved on a memory and/or database to which processor 104 has access. Verification may include a link to click that sends a verification to processor 104. Verification may include a temporary code for user to then input from user device 116 to confirm that the device is user device 116. Any description of communication and/or data transmitted to and/or from a user is understood to include embodiments wherein the communication and/or the data is transmitted to and/or from user device 116, respectively. User may be a prospective employee seeking employment.

Processor 104 may receive verbal communication 112 from user device 116, another computing device, an educational institution such as a university or high school, an employer, memory 108, and/or a database. Communication between user and processor 104 may be initiated by the user or processor 104. Verbal communication 112 may include at least a user document 120. As used in this disclosure, a "user document" is a document that includes information about the user. User document 120 may include at least a user characteristic 124. User document 120 may include a transcript from an educational institution the user attended such as a college transcript, a written resume, a letter of recommendation, and/or the like. As used in this disclosure, a "user characteristic" is information about a prospective employee pertaining to qualifications of the prospective employee and may include, for example, skills such as communication skills and managerial skills, accreditations, a minimum grade point average (GPA), degree, major and/or focus of study, prior employment, experience, and/or the like.

Still referring to FIG. 1, processor 104 may parse, using a chatbot 128, at least a user characteristic from the verbal communication 112. As used in the current disclosure, a "chatbot" is a computer program designed to simulate conversation with users. A chatbot may accomplish this by presenting the user with questions. In some embodiments, chatbot 128 may be designed to convincingly simulate the way a human would behave/respond as a conversational partner. In an embodiment, chatbot 128 may be configured to ask questions from a questionnaire to user. Chatbot 128 questions may also be generated as a function of an employer's input. For example, an employer seeking candidates for a job position may provide input to processor 104, and the processor 104 may generate chatbot 128 questions based on the input. Additionally, chatbot 128 may be configured to respond to user based on the user's verbal communication 112.

With continued reference to FIG. 1, at least a user document 120 may be received by processor 104 via chatbot 128. Chatbot 128 may prompt user with at least a request 132. As used in this disclosure, a "request" is a request, such as a question, to a user for information about the user. A request may seek information about a user characteristic 124. Request 132 prompted by chatbot 128 may be consistent with disclosure of an initial request and/or a subsequent request as disclosed in U.S. patent application Ser. No. 17/690,451 filed on Mar. 9, 2022, and entitled "APPARATUS AND METHODS FOR CREATING A VIDEO RECORD", the entirety of which in incorporated herein by reference. In some embodiments, chatbot 128 may prompt user to respond to request 132, such as questions, in text or a video format. For example, chatbot 128 may verbally, audially and/or with text, ask user questions prompting the user to respond orally with verbal communication 112, which processor 104 may record. Processor 104 may convert user's verbal communication 112 to text as described in this disclosure. A transcript of verbal communication 112 to chatbot 128 may be displayed to an employer.

Chatbot 128 may be configured to provide user with a plurality of options as an input into the chatbot 128. Chatbot 128 entries may include multiple choice, short answer response, true or false responses, and the like. In some embodiments, chatbot 128 communication to user, including requests 132, may be based on a specific posting 136. With continued reference to FIG. 1, processor 104 may be configured to receive a selection from user device 116 of a posting 136. A "posting," as used in this disclosure, is a communication of a job position for which a prospective employer is seeking or may be seeking one or more candidates to potentially fill the job position. Processor 104 may receive a plurality of postings 136. A posting may include information about the employer such as the employer's name and address; compensation such as a salary, an hourly wage, and/or benefits; a title of the job position; geographical location of where the job will be performed and/or whether the job is to be performed remotely; a description of the job position such as a listing of responsibilities, expectations, and/or goals to be accomplished; criteria 140; and/or the like. A job position may be part-time and/or full-time. Job position may be as an employee and/or contractor. As used in this disclosure, "criteria," are skills, accreditations, a minimum grade point average (GPA), degree, major and/or focus of study, and/or experience. Criteria 140 may include requirements and/or preferences. As used in this disclosure, a "requirement" is a criterion that must be satisfied for a prospective employee to be eligible for consideration for a posting. As used in this disclosure, a "preference" is a desired criterion, but it is not required for a prospective employee to be considered for a posting. Request 132 may be based on a specific posting 136, such as a posting 136 for which user has selected to apply. For example, user may select posting 136 for a position as a professor in philosophy at a community college, and request 132 may be, without limitation, "How many years have you taught philosophy?", "Have you written any published articles?", or "Please explain your educational background in philosophy." Additional disclosure pertaining to posting can be found in U.S. patent application Ser. No. 17/582,059 filed on Jan. 24, 2022, and entitled "APPARATUS AND METHODS FOR MATCHING VIDEO RECORDS WITH POSTINGS USING AUDIOVISUAL DATA PROCESSING", the entirety of which in incorporated herein by reference. Employer may decide on what type of requests 132 are appropriate. In some embodiments, chatbot 128 may be configured to allow user to input verbal communication 112 as a freeform response into the chat box. Chatbot 128 may then use a decision tree, data base, or other data structure to respond to the users entry into the chatbot 128 as a function of a chatbot 128 input. As used in the current disclosure, "chatbot input" is any response that a candidate or employer inputs in to a chatbot 128 as a response to a prompt or question, such as verbal communication 112.

With continued reference to FIG. 1, processor 104 may be configured to analyze verbal communication 112 submitted into chatbot 128. Chatbot 128 may be able to analyze verbal communication 112 based on pre-determined set of factors, employer input, keywords, composition, and clarity of user's verbal communication 112. In some embodiments, processor 104 may search for a synonyms or other equivalent words to the keywords and correlate those responses to the keywords. User classification may occur by identifying keywords within verbal communication 112 and/or by employing a machine learning model. Request 132 may be based on at least a user document 120, such as user's transcript and/or written resume. For example, processor 104 may be configured to utilize optical character recognition (OCR) or any word recognition process discussed in this disclosure to identify one or more keywords in user document 120. As used in this disclosure, a "keyword" is an element of word or syntax used to identify and/or match elements to each other. Keyword may be at least a user characteristic 124. Keywords may be stored in a database, such as keyword database, from which processor 104 may retrieve the keywords. Keyword database may be implemented, without limitation, as a relational database, a key-value retrieval datastore such as a NOSQL database, or any other format or structure for use as a datastore that a person skilled in the art would recognize as suitable upon review of the entirety of this disclosure. Keyword may include locations such as cities, states, and regions; use characteristic 152; criteria 140 as discussed below; and/or the like. In some embodiments, request 132 may be based on at least a keyword processor 104 identifies in user document 120. For example, processor 104 may identify "electrical engineering" in user's university transcript and create an initial request 132 concerning electrical engineering such as, "Are you looking for a job in electrical engineering?" or "How many years of experience do you have working as an electrical engineer?" In some embodiments, user may select at least a keyword to indicate a type of job the user is interested in. For example, user may select "teacher" and a subcategory "kindergarten teacher" to identify that the user is seeking employment as a kindergarten teacher. Request 132 may include asking user for name, address, email address, phone number, whether they are currently employed, etc.

With continued reference to FIG. 1, processor 104 may be configured to recognize at least a keyword in user document 120 as a function of visual verbal content. In some cases, recognizing a plurality of keywords in user document 120 may include using a language processing module 172. In some embodiments, samples, and examples of keywords submitted by a hiring entity or apparatus 100 administrator may be used to train language processing module 172 in identifying keywords. For instance, a sample may be a list of synonyms used for common words used by hiring entities, such as "advocate", "attorney-at-law", "counsel", "counselor", "counselor-at-law", "lawyer", and "legal eagle". These samples and examples may additionally be used to classify keywords to similar keywords contained in a plurality of user identifiers, as described further below. Language processing module 172 may include any hardware and/or software module. For example, language processing module 172 may be used to extract from user document 120 all information pertaining to "truck driver". Language processing module 172 may be configured to extract, from user document 120, one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

Still referring to FIG. 1, language processing module 172 may operate to produce a language processing model. Language processing model may include a program automatically generated by processor 104 and/or language processing module 172 to produce associations between one or more words extracted from at least a user document 120 and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

Still referring to 1, language processing module 172 and/or diagnostic engine may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module 172 may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Continuing to refer to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, language processing module 172 may use a corpus of documents to generate associations between language elements in the language processing module 172, and diagnostic engine may then use such associations to analyze words extracted from one or more documents and determine that the one or more documents indicate significance of a category. In an embodiment, language module and/or processor 104 may perform this analysis using a selected set of significant documents, such as documents identified by one or more experts as representing good information; experts may identify or enter such documents via graphical user interface or may communicate identities of significant documents according to any other suitable method of electronic communication, or by providing such identity to other persons who may enter such identifications into processor 104. Documents may be entered into processor 104 by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database or compendium of documents such as JSTOR as provided by Ithaka Harbors, Inc. of New York.

With continued reference to FIG. 1, identifying keywords in user document 120 may include matching a plurality of keywords to words in user document 120. In some embodiments, matching may include classifying keywords contained in keyword database to similar words contained in user document 120. For example, keywords relating "web developer internship experience" may be matched to similar words in user document 120. Similar words may be based on synonyms of keywords as described above. Matching may occur through a classifier 176. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. Classifier 176 may be configured to output at least a datum that labels or otherwise identifies a set of data that are clustered together, found to be close under a distance metric as described below, or the like. Processor 104 and/or another device may generate classifier 176 using a classification algorithm, defined as a processes whereby processor 104 derives classifier 176 from training data. In an embodiment, training data may include data from a database as described in this disclosure including keyword database, sample and examples of keywords and words similar to keywords, language processing module 172, and any other training data described throughout this disclosure. Classifier 176 may take the plurality of keywords from keyword database as algorithm inputs. Classifier 176 may then use the training data disclosed above to output data bins of words similar to keywords matched to keywords. Each data bin may be categorized to each keyword and labeled with the keyword. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. Words similar to keywords that are classified and labeled according to the corresponding keywords may become keywords and/or be added to keyword database.

Still referring to FIG. 1, processor 104 may be configured to generate classifier 176 using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)+P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Processor 104 may then calculate a likelihood table by calculating probabilities of different data entries and classification labels. Processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, processor 104 may be configured to generate classifier 176 using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier 176 to select the k most similar entries training data to a given sample, determining the most common classifier 176 of the entries in a database, and classifying the known sample; this may be performed recursively and/or iteratively to generate classifier 176 that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute 1 as derived using a Pythagorean norm:

$$l = \sqrt{\sum_{i=0}^{n} a_i^2},$$

where ai is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values. Keyword may be consistent with disclosure of keyword in U.S. patent application Ser. No. 17/690,424 filed on Mar. 9, 2022, and entitled "APPARATUSES AND METHODS FOR LINKING POSTING DATA", which is incorporated herein by reference in its entirety.

Still referring to FIG. 1, processor 104 may implement one or more algorithms or generate one or more machine-learning modules, such as request module 144, to generate request 132 to user. In one or more embodiments, the machine-learning module may be generated using training data. Training data may include inputs and corresponding predetermined outputs so that a machine-learning module may use the correlations between the provided exemplary inputs and outputs to develop an algorithm and/or relationship that then allows the machine-learning module to determine its own outputs for inputs. Training data may contain correlations that a machine-learning process may use to model relationships between two or more categories of data elements. The exemplary inputs and outputs may come from a database, such as any database described in this disclosure, or be provided by a user such as a prospective employee, and/or an employer. In other embodiments, a machine-learning module may obtain a training set by querying a communicatively connected database that includes past inputs and outputs. Training data may include inputs from various types of databases, resources, and/or user inputs and outputs correlated to each of those inputs so that a machine-learning module may determine an output. Correlations may indicate causative and/or predictive links between data, which may be modeled as relationships, such as mathematical relationships, by machine-learning processes, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements. Request module 144 may be generated using training data, such as request data. Request module 144 may be trained by correlated inputs and outputs in request data. Inputs of request data may include keywords, verbal communication 112 containing at least a keyword, and/or user documents 120 containing at least a keyword. Outputs of request data may include requests 132 corresponding to the inputs. Request data may be inputs and corresponding outputs that have already been determined whether manually, by machine, or any other method. Request data may include previous outputs such that request module 144 iteratively produces outputs. In some embodiments, criteria 140 in request data may be requirements and not preferences. In embodiments in which request 132 is based on posting 136, inputs of request data may include criteria 140 and/or postings 136 containing criteria 140, and outputs of request data may include requests 132 corresponding to the inputs. Request module 144 using a machine-learning process may output request 132 based on request data and input of criteria 140, postings 136 including criteria 140, keywords, and/or user documents 120 containing at least a keyword. Chatbot 128 may utilize request module 144 and prompt user with request 132 based on output of the request module 144. For example, chatbot 128 may prompt user with request 132, wherein the chatbot 128 is configured to output the request 132, utilizing request module 144, based on an input of at least a keyword, verbal communication 112 containing at least a keyword, and/or user documents 120 containing at least a keyword and request data. As another example, chatbot 128 may prompt user with request 132, wherein the chatbot 128 is configured to output the request 132, utilizing request module 144, based on an input of criteria 140 and/or postings 136 containing criteria 140 and request data.

With continuing reference to FIG. 1, processor 104 may be configured to respond to verbal communication 112 with request 132 using a decision tree. A "decision tree," as used in this disclosure, is a data structure that represents and combines one or more determinations or other computations based on and/or concerning data provided thereto, as well as earlier such determinations or calculations, as nodes of a tree data structure where inputs of some nodes are connected to outputs of others. Decision tree may have at least a root node, or node that receives data input to the decision tree, corresponding to at least a user input into a chatbot 128. decision tree has at least a terminal node, which may alternatively or additionally be referred to herein as a "leaf node," corresponding to at least an exit indication; in other words, decision and/or determinations produced by decision tree may be output at the at least a terminal node. decision tree may include one or more internal nodes, defined as nodes connecting outputs of root nodes to inputs of terminal nodes. Processor 104 may generate two or more decision trees, which may overlap; for instance, a root node of one tree may connect to and/or receive output from one or more terminal nodes of another tree, intermediate nodes of one tree may be shared with another tree, or the like.

Still referring to FIG. 1, processor 104 may build decision tree by following relational identification; for example, relational indication may specify that a first rule module receives an input from at least a second rule module and generates an output to at least a third rule module, and so forth, which may indicate to processor 104 an in which such rule modules will be placed in decision tree. Building decision tree may include recursively performing mapping of execution results output by one tree and/or subtree to root nodes of another tree and/or subtree, for instance by using such execution results as execution parameters of a subtree. In this manner, processor 104 may generate connections and/or combinations of one or more trees to one another to define overlaps and/or combinations into larger trees and/or combinations thereof. Such connections and/or combinations may be displayed by visual interface to user, for instance in first view, to enable viewing, editing, selection, and/or deletion by user; connections and/or combinations generated thereby may be highlighted, for instance using a different color, a label, and/or other form of emphasis aiding in identification by a user. In some embodiments, subtrees, previously constructed trees, and/or entire data structures may be represented and/or converted to rule modules, with graphical models representing them, and which may then be used in further iterations or steps of generation of decision tree and/or data structure. Alternatively or additionally subtrees, previously constructed trees, and/or entire data structures may be converted to APIs to interface with further iterations or steps of methods as described in this disclosure. As a further example, such subtrees, previously constructed trees, and/or entire data structures may become remote resources to which further iterations or steps of data structures and/or decision trees may transmit data and from which further iterations or steps of generation of data structure receive data, for instance as part of a decision in a given decision tree node.

Continuing to refer to FIG. 1, decision tree may incorporate one or more manually entered or otherwise provided decision criteria. decision tree may incorporate one or more decision criteria using an application programmer interface (API). decision tree may establish a link to a remote decision module, device, system, or the like. decision tree may perform one or more database lookups and/or look-up table lookups. decision tree may include at least a decision calculation module, which may be imported via an API, by incorporation of a program module in source code, executable, or other form, and/or linked to a given node by establishing a communication interface with one or more exterior processes, programs, systems, remote devices, or the like; for instance, where a user operating system has a previously existent calculation and/or decision engine configured to make a decision corresponding to a given node, for instance and without limitation using one or more elements of domain knowledge, by receiving an input and producing an output representing a decision, a node may be configured to provide data to the input and receive the output representing the decision, based upon which the node may perform its decision.

Still referring to FIG. 1, verbal communication 120 may be a video record 148 of user. As used in this disclosure, a "video record" is data including an audio recording of a prospective employee for purposes of potentially acquiring a job. The audio recording may include verbal content 152. For example, verbal content 152 may include a monologue. Video record 148 may also include a visual recording of the prospective employee. Visual recording may include an image component 156. As used in this disclosure, "image component" may be a visual representation of information, such as a plurality of temporally sequential frames and/or pictures, related to video record 148. For example, image component 156 may include animations, still imagery, recorded video, and the like. In some cases, at least a user characteristic 124 may be explicitly conveyed within video record 148. Alternatively, or additionally, in some cases, at least a user characteristic 124 may be conveyed implicitly in video record 148. Video record 148 may be communicated by way of digital signals, for example between computing devices which are communicatively connected with at least a wireless network. Video record 148 may be compressed to optimize speed and/or cost of transmission of video. Video record 148 may be compressed according to a video compression coding format (i.e., codec). Exemplary video compression codecs include H.26x codecs, MPEG formats, VVC, SVT-AV1, and the like. In some cases, compression of a digital video may be lossy, in which some information may be lost during compression. Alternatively, or additionally, in some cases, compression of a video record 148 may be substantially lossless, where substantially no information is lost during compression. Processor 104 may receive posting 136 and/or video record 148 from a user, such as an employer, hiring agency, recruiting firm, and/or a prospective employee. Processor 104 may receive posting 136 and/or video record 148 from a computing device through a network, from a database, and or store posting 136 and/or video record 148 in a memory and retrieve from the memory. Apparatus 100 may include a memory 108. Memory 108 may be communicatively connected to processor 104 and may be configured to store information and/or datum related to apparatus 100, such as request 132, posting 136 including criteria 140, user document 120, keywords selected by user, video record 148 including verbal communication 112 with at least a user characteristic 124.

Still referring to FIG. 1, processor 104 may be configured to extract a plurality of textual elements from video record 148 of verbal communication 112, which may include at least a user characteristic 124. Processor 104 may include audiovisual speech recognition (AVSR) processes to recognize verbal content 152 in video records 140. For example, processor 104 may use image component 156 to aid in recognition of audible verbal content 152 such as viewing prospective employee move their lips to speak on video to process the audio content of video record 148. AVSR may use image component 156 to aid the overall translation of the audio verbal content 152 of video records 140. In some embodiments, AVSR may include techniques employing image processing capabilities in lip reading to aid speech recognition processes. In some cases, AVSR may be used to decode (i.e., recognize) indeterministic phonemes or help in forming a preponderance among probabilistic candidates. In some cases, AVSR may include an audio-based automatic speech recognition process and an image-based automatic speech recognition process. AVSR may combine results from both processes with feature fusion. Audio-based speech recognition process may analysis audio according to any method described herein, for instance using a Mel frequency cepstral coefficients (MFCCs) and/or log-Mel spectrogram derived from raw audio samples. Image-based speech recognition may perform feature recognition to yield an image vector. In some cases, feature recognition may include any feature recognition process described in this disclosure, for example a variant of a convolutional neural network. In some cases, AVSR employs both an audio datum and an image datum to recognize verbal content 152. For instance, audio vector and image vector may each be concatenated and used to predict speech made by prospective employee, who is 'on camera.'

With continued reference to FIG. 1, processor 104 may be configured to analyze verbal communication 112. Analyzing verbal communication 112 may include identifying at least a user characteristic 124 from video record 148. In some cases, processor 104 may be configured to recognize at least a keyword as a function of visual verbal content 152. In some cases, recognizing at least keyword may include optical character recognition. In some cases, processor 104 may generate a transcript of much or even all verbal content 152 from video record 148. Processor 104 may use transcript to analyze the content of video record 148 and extract at least a user characteristic 124.

Still refereeing to FIG. 1, in some embodiments, optical character recognition or optical character reader (OCR) includes automatic conversion of images of written (e.g., typed, handwritten or printed text) into machine-encoded text. In some cases, recognition of at least a keyword from an image component 156 may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine-learning processes. In some cases, intelligent word recognition (IWR) may recognize written text, one word at a time, for instance by employing machine-learning processes.

Still referring to FIG. 1, in some cases OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information may make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image component 156. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to image component 156 to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component 156. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component 156.

Still referring to FIG. 1, in some embodiments an OCR process may include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component 156. Matrix matching may also rely on a stored glyph being in a similar font and at a same scale as input glyph. Matrix matching may work best with typewritten text.

Still referring to FIG. 1, in some embodiments, an OCR process may include a feature extraction process. In some cases, feature extraction may decompose a glyph into at least a feature. Exemplary non-limiting features may include corners, edges, lines, closed loops, line direction, line intersections, and the like. In some cases, feature extraction may reduce dimensionality of representation and may make the recognition process computationally more efficient. In some cases, extracted feature may be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors algorithm) may be used to compare image features with stored glyph features and choose a nearest match. OCR may employ any machine-learning process described in this disclosure, for example machine-learning processes described with reference to FIG. 2. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, Calif., United States.

Still referring to FIG. 1, in some cases, OCR may employ a two-pass approach to character recognition. A first pass may try to recognize a character. Each character that is satisfactory is passed to an adaptive classifier as training data. The adaptive classifier then gets a chance to recognize characters more accurately as it further analyzes image components 124. Since the adaptive classifier may have learned something useful a little too late to recognize characters on the first pass, a second pass is run over the image components 148. Second pass may include adaptive recognition and use characters recognized with high confidence on the first pass to recognize better remaining characters on the second pass. In some cases, two-pass approach may be advantageous for unusual fonts or low-quality image components 148 where visual verbal content 152 may be distorted. Another exemplary OCR software tool include OCRopus. OCRopus development is led by German Research Centre for Artificial Intelligence in Kaiserslautern, Germany. In some cases, OCR software may employ neural networks.

Still referring to FIG. 1, in some cases, OCR may include post-processing. For example, OCR accuracy may be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content 152. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of apriori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, request 132 may include a plurality of requests 132. For example, processor 104 may be configured to prompt user with at least a request 132 based on verbal communication 112. A second request 132 may be a follow up to a preceding request 132. For example, if an initial request 132 is "Are you open to relocating for employment?" and verbal communication 112 is in the affirmative such as "yes" or "I think so," then subsequent request 132 may be "Which cities, states, or regions would you consider moving to?". As another example, if user indicates in initial verbal communication 112 that the user was once employed as a manager of a team of people, subsequent request 132 may ask the user to describe a scenario where the user gave critical feedback to a team member when the team member fell below expectations. Subsequent request 132 may also be based on a specific posting 136 such as, "Would you be willing to relocate to Chicago?" if the posting 136 was for a position located in Chicago. Subsequent request 132 may seek additional information related to initial verbal communication 112. For example, if initial verbal communication 112 is an affirmative response to initial request 132 of whether user has written any published articles, subsequent request 132 may be, for example, "How many published articles have you authored?", "What are the subject matters of the articles?", "In which journals or publications were the articles published", or "what are the titles of the articles?".

Requests 132 may be included in a set of requests for a subset of users. For example, each industry, type of profession, and/or field of work may have an associated set of requests to procure a consistent set of information from user. As example, Processor 104 may determine that user is an accountant by user document 120, selected keyword, and/or verbal communication 112 the user has already submitted. Processor 104 may then prompt user with requests 112 from a set of requests associated with accountant. Processor 104 may ask "Are you a Certified Public Accountant?" If user's response is affirmative, processor 104 may ask user how many years of experience the user has as a CPA. Additional requests in the set of requests associated with accountants may include, for example, "What is your area of expertise?" and "Do you have experience in Accounts Receivable?" In some embodiments, processor 104 may be configured to determine which set of requests apply to user based on verbal communication 112. Processor 104 may determine a category corresponding to user. For example, categories may include accountant, mechanical engineer, elementary school teacher, etc., and each category may have an associated set of requests. In these embodiments, inputs of request data verbal communication 112, and outputs of request data may be categories corresponding to the verbal communication 112, wherein the categories identify which set of requests apply to user. For example, categories may include accountant, mechanical engineer, elementary school teacher, etc., and each category may have an associated set of requests. Sets of requests may be stored in memory 108 or a database.

Still referring to FIG. 1, processor 104 is configured to screen user as a function of user characteristic 124. Screening may include generating a compatibility score 160 based on a compatibility of at least a user characteristic 124 with posting 136, employer input, selected keyword, and/or user document 120. Compatibility score 160 may be based on at least a requirement of criteria 140 for posting 136. For example, if a requirement of criteria 140 is five years' experience as a sales manager and user characteristic 124 includes seven years' experience as a sales manager, then compatibility score 160 may be high. Compatibility score 160 may be numerical, for example out of a score of one hundred. In some embodiments, compatibility score 160 may include qualitative descriptors, such as great, good, average, lacking, and/or poor. Compatibility score 160 may be consistent with disclosure of compatibility score in U.S. patent application Ser. No. 17/582,087 filed on Jan. 24, 2022, and entitled "DIGITAL POSTING MATCH RECOMMENDATION APPARATUS AND METHODS", which is incorporated by reference herein in its entirety.

Screening a user may include determining a confidence score 164. As used in this disclosure, a "confidence score" is a score reflecting a confidence in the screening process. In some embodiments, confidence score 164 may be reflective of a level of confidence in the accuracy of a compatibility score. Similar to compatibility score 160, confidence score 164 may include a quantitative value, for example out of a score of one hundred or a value from 1-10. In some embodiments, confidence score 164 may include qualitative descriptors, such as great, good, average, lacking, and/or poor. Confidence score 164 may be based on an amount of the verbal communication 112, such as a length of time of verbal communication 112, a word count of the verbal communication 112, and/or the number of requests 132 to which user responded. For example, a higher word count of verbal communication 112 may imply a more complete response by user to one or more requests 132, which may correlate with a greater understanding of user and of user characteristics 124. Confidence score 164 may be based on whether processor receives at least a user document 120 and/or an amount of details included in the user document 120. For example, transcripts may corroborate user characteristic 124 parsed from oral verbal communication 112. Confidence score 164 may be based on an amount of criteria 140 in posting 136. For example, few criteria 140 in posting 136 may reduce the certainty that user is compatible with the posting 136. A large number of criteria 140 and/or a high level of detail for the criteria 140 may provide greater incite as to whether user is compatible with posting 136. Confidence score 164 may be based on an amount of requirements for criteria 140 of posting 136. Processor 104 may transmit to employer of posting 136 all verbal communications 112 and/or user documents 120 of users with a threshold compatibility score 160 and/or a threshold confidence score 164 for the posting 136.

Still referring to FIG. 1, processor 104 may implement one or more algorithms or generate one or more machine-learning modules, such as confidence module 168, to generate confidence score 164. Confidence module 168 may be generated using training data, such as confidence data. Confidence module 168 may be trained by correlated inputs and outputs in confidence data. Inputs of confidence data may include factors of confidence score 164 discussed above such as verbal communications 112, amounts or word counts of verbal communications 112, numbers of requests 132, amount of user documents 120, levels of detail of user documents 120, and/or criteria 140 of postings 136. Outputs of confidence data may include confidence scores 164 corresponding to the inputs. Confidence data may be inputs and corresponding outputs that have already been determined whether manually, by machine, or any other method. Confidence data may include previous outputs such that confidence module 168 iteratively produces outputs. Confidence module 168 using a machine-learning process may output confidence score 164 based on confidence data and input of verbal communications 112, amounts or word counts of verbal communications 112, numbers of requests 132, amount of user documents 120, levels of detail of user documents 120, and/or criteria 140 of postings 136.

With continued reference to FIG. 1, processor 104 may be configured to post user document 120, posting 136, verbal communication 112, video record 148, compatibility score 160, and/or confidence score 164 on an immutable sequential listing, such as blockchain, as discussed below with reference to FIG. 4.

Figure 2:
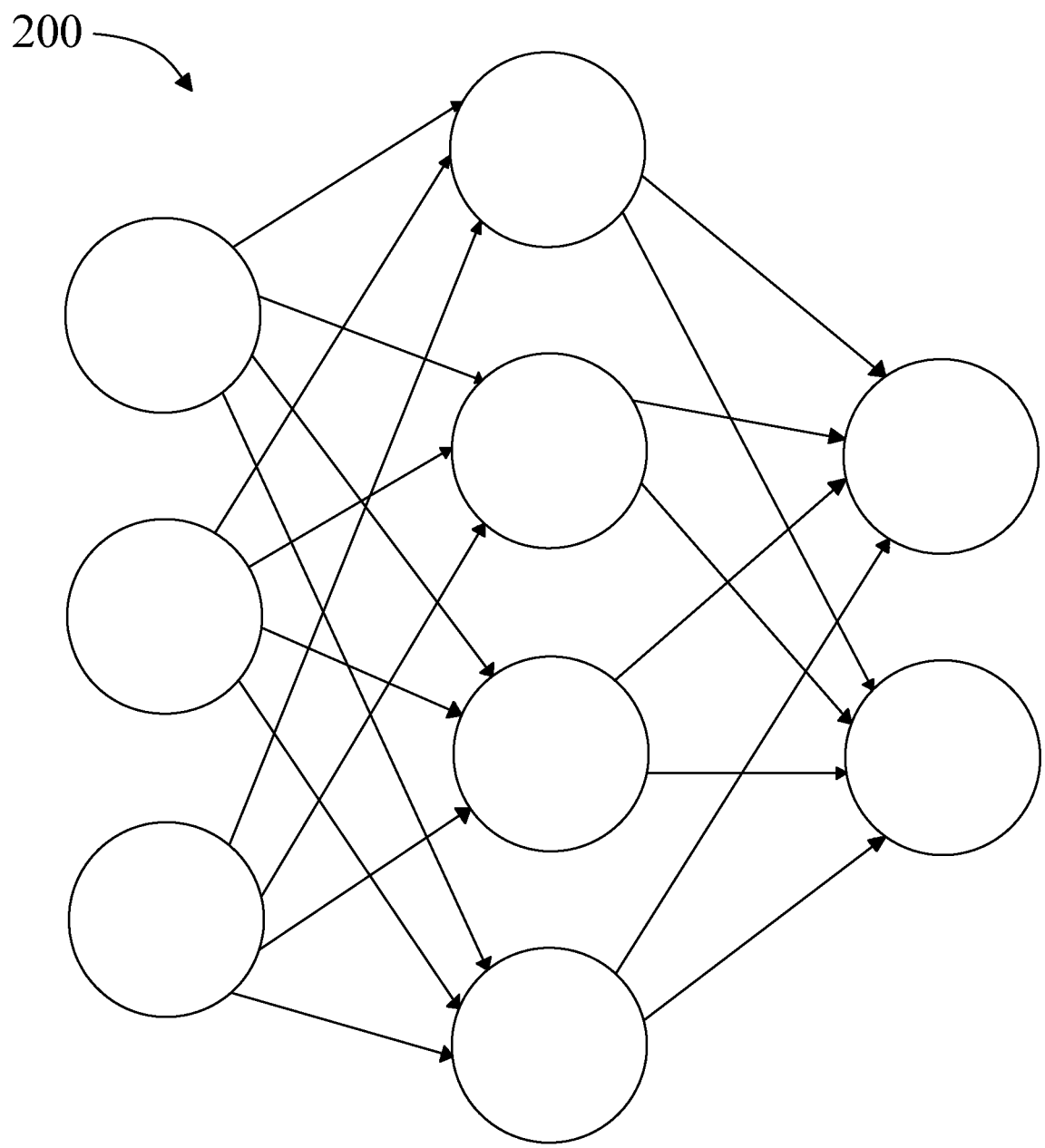
FIG. 2 illustrates an exemplary neural network.

Referring now to FIG. 2, an exemplary embodiment of neural network 200 is illustrated. A neural network 200 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

Figure 3:
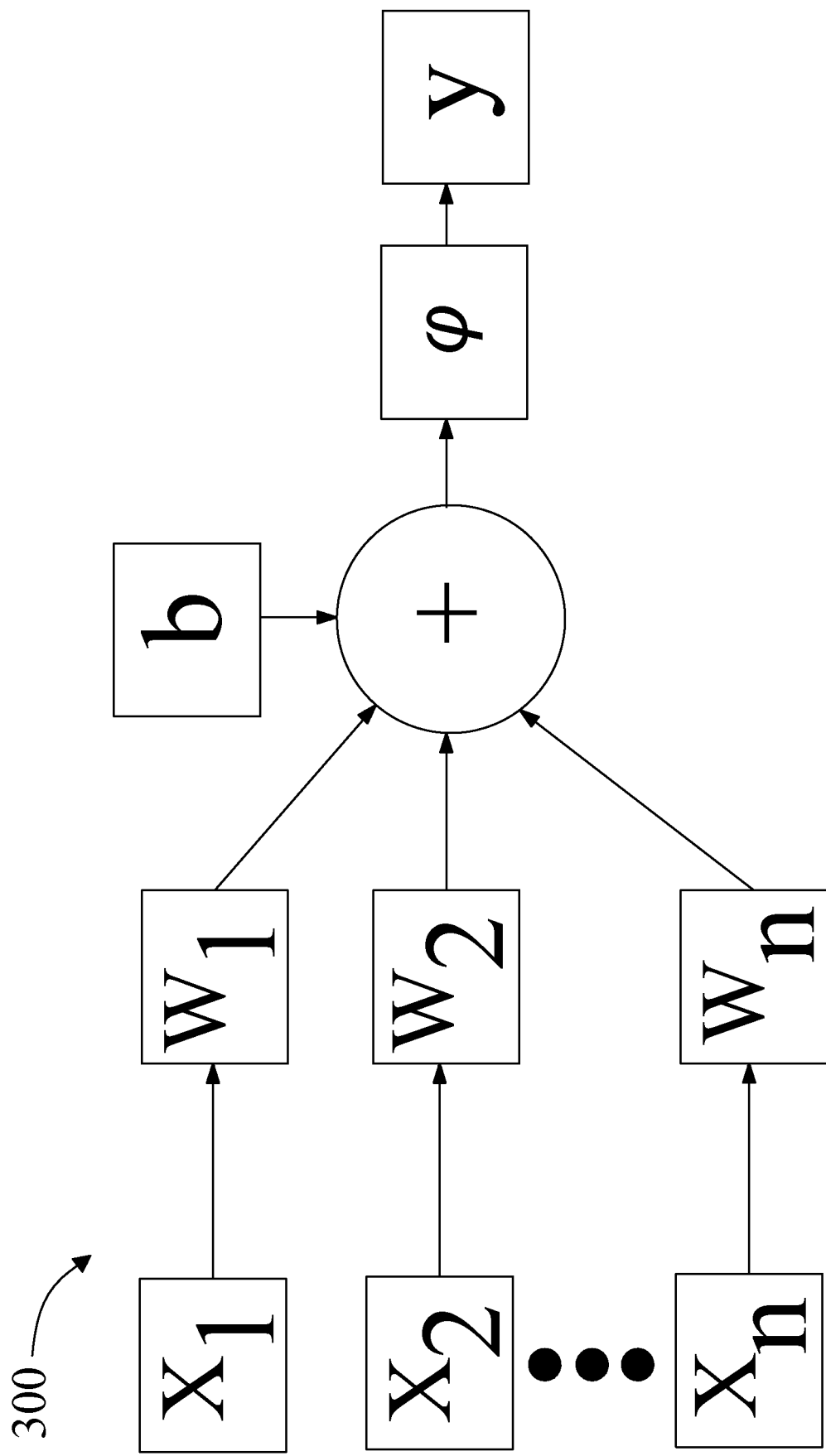
FIG. 3 is a block diagram of an exemplary node.

Referring now to FIG. 3, an exemplary embodiment of a node 300 of a neural network is illustrated. Node 300 may include, without limitation a plurality of inputs x; that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights w; may be determined by training a neural network using training data, which may be performed using any suitable process as described above.

Figure 4:
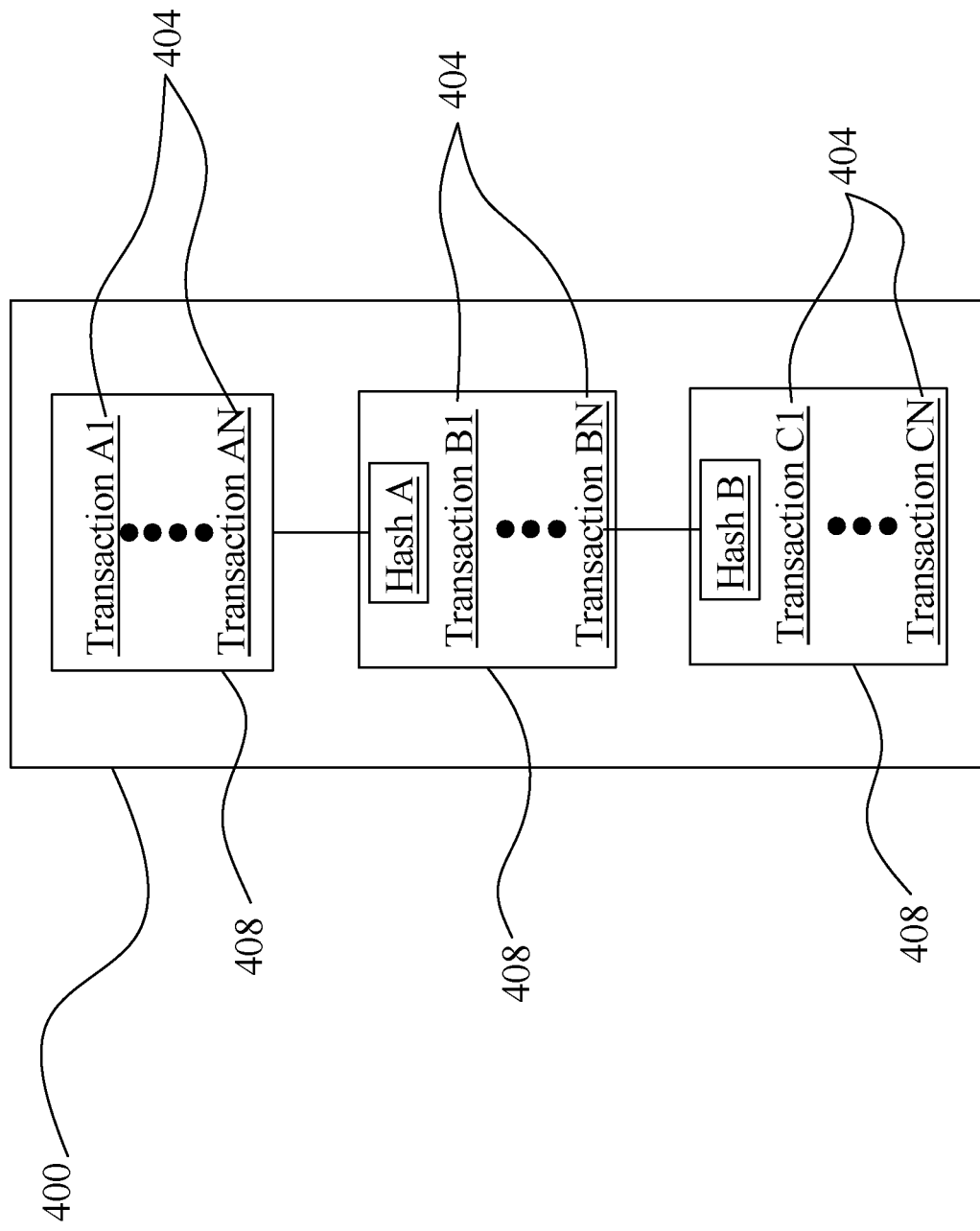
FIG. 4 is a block diagram of an exemplary immutable sequential listing.

Referring now to FIG. 4, an exemplary embodiment of an immutable sequential listing 400 is illustrated. Data elements are listing in immutable sequential listing 400; data elements may include any form of data, including textual data, image data, encrypted data, cryptographically hashed data, and the like. Data elements may include, without limitation, one or more at least a digitally signed assertion. In one embodiment, a digitally signed assertion 404 is a collection of textual data signed using a secure proof as described in further detail below; secure proof may include, without limitation, a digital signature. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 404. In an embodiment, collection of textual data states that the owner of a certain transferable item represented in a digitally signed assertion 404 register is transferring that item to the owner of an address. A digitally signed assertion 404 may be signed by a digital signature created using the private key associated with the owner's public key, as described above.

Still referring to FIG. 4, in some embodiments, an address is a textual datum identifying the recipient of virtual currency or another item of value, such as verbal communication 112 and/or user document 120, in a digitally signed assertion 404. In some embodiments, address may be linked to a public key, the corresponding private key of which is owned by the recipient of a digitally signed assertion 404. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 404 may record a subsequent a digitally signed assertion 404 transferring some or all of the value transferred in the first a digitally signed assertion 404 to a new address in the same manner. A digitally signed assertion 404 may contain textual information that is not a transfer of some item of value in addition to, or as an alternative to, such a transfer. For instance, as described in further detail below, a digitally signed assertion 404 may indicate a confidence level associated with a distributed storage node as described in further detail below.

In an embodiment, and still referring to FIG. 4 immutable sequential listing 400 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 400 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 4, immutable sequential listing 400 may preserve the order in which the at least a posted content took place by listing them in chronological order; alternatively or additionally, immutable sequential listing 400 may organize digitally signed assertions 404 into sub-listings 408 such as "blocks" in a blockchain, which may be themselves collected in a temporally sequential order; digitally signed assertions 404 within a sub-listing 408 may or may not be temporally sequential. User document 120, posting 136, verbal communication 112, video record 148, compatibility score 160, and/or confidence score 164 may be posted on immutable sequential listing 400, such as blockchain. Training data for any machine-learning module discussed in this disclosure may be posted on immutable sequential listing 400, such as blockchain. A master list may be included. Master list may include a hash-table and/or distributed hash table which may be used to locate a requestor-linked data store. For example, a public key associated with a requestor containing location information pertaining to requestor-linked data store may be converted into a series of hash functions. This may occur by converting an entry into a series of integers by using a hash function. A hash function may include any function that may be used to map a set of data which falls into the hash table. Hash functions may be stored in a hash table, where it can be quickly retrieved using a hashed key. The hashed key may then be used to access requestor-linked data store when prompted. Using the hashed key, a hash function may compute an index that may suggest where requestor-linked data store may be found. Locating may also be performed by linking the at least an encrypted data record to a digital signature associated with the requestor. Requestor may produce a digital signature, which may then be linked to the at least an encrypted data record and locate to the location of the at least an encrypted data record. When the digital signature is presented, it may contain location information of the at least an encrypted data record and allow access control regulator to locate the precise location of encrypted data record. For example, digital signature may be generated using a public and/or private key linked to requestor which may contain location information of encrypted data record. In an embodiment, encrypted data record may be linked to a requestor key, so that when a requestor key is presented, location of encrypted data record becomes apparent. Locating may also be performed by information that may be contained in data access request. For example, a data access request associated with a user may contain location information of encrypted data record that requestor is attempting to access. When generating a data access request, requestor may specify the location of encrypted data record that may then be transmitted to access control regulator. Additional disclosure pertaining to immutable sequential listing can be found in U.S. patent application Ser. No. 17/486,461 filed on Sep. 27, 2021, and entitled "SYSTEMS AND METHODS FOR SCORE GENERATION FOR APPLICANT TRACKING", the entirety of which in incorporated herein by reference.

With continued reference to FIG. 4, the ledger may preserve the order in which at least a posted content took place by listing them in sub-listings 408 and placing the sub-listings 408 in chronological order. The immutable sequential listing 400 may be a distributed, consensus-based ledger, such as those operated according to the protocols promulgated by Ripple Labs, Inc., of San Francisco, Calif., or the Stellar Development Foundation, of San Francisco, Calif., or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger, but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 400 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp. Immutable sequential listing 400 and/or any component of the immutable sequential listing 400, such as sub-listing 408 and digitally signed assertions 404, may be validated by processor 104 consistent with disclosure of validation in U.S. patent application Ser. No. 16/698,182 filed on Nov. 27, 2019 and titled "SYSTEMS AND METHODS FOR BIOMETRIC KEY GENERATION IN DATA ACCESS CONTROL, DATA VERIFICATION, AND PATH SELECTION IN BLOCK CHAIN-LINKED WORKFORCE DATA MANAGEMENT", which is incorporated by reference herein in its entirety.

In some embodiments, and with continued reference to FIG. 4, immutable sequential listing 400, once formed, may be inalterable by any party, no matter what access rights that party possesses. For instance, immutable sequential listing 400 may include a hash chain, in which data is added during a successive hashing process to ensure non-repudiation. Immutable sequential listing 400 may include a block chain. In one embodiment, a block chain is immutable sequential listing 400 that records one or more new at least a posted content in a data item known as a sub-listing 408 or "block." An example of a block chain is the BITCOIN block chain used to record BITCOIN transactions and values. Sub-listings 408 may be created in a way that places the sub-listings 408 in chronological order and link each sub-listing 408 to a previous sub-listing 408 in the chronological order so that any computing device may traverse the sub-listings 408 in reverse chronological order to verify any at least a posted content listed in the block chain. Each new sub-listing 408 may be required to contain a cryptographic hash describing the previous sub-listing 408. In some embodiments, the block chain may contain a single first sub-listing 408 sometimes known as a "genesis block."

Still referring to FIG. 4, the creation of a new sub-listing 408 may be computationally expensive; for instance, the creation of a new sub-listing 408 may be designed by a "proof of work" protocol accepted by all participants in forming the immutable sequential listing 400 to take a powerful set of computing devices a certain period of time to produce. Where one sub-listing 408 takes less time for a given set of computing devices to produce the sub-listing 408, protocol may adjust the algorithm to produce the next sub-listing 408 so that it will require more steps; where one sub-listing 408 takes more time for a given set of computing devices to produce the sub-listing 408, protocol may adjust the algorithm to produce the next sub-listing 408 so that it will require fewer steps. As an example, protocol may require a new sub-listing 408 to contain a cryptographic hash describing its contents; the cryptographic hash may be required to satisfy a mathematical condition, achieved by having the sub-listing 408 contain a number, called a nonce, whose value is determined after the fact by the discovery of the hash that satisfies the mathematical condition. Continuing the example, the protocol may be able to adjust the mathematical condition so that the discovery of the hash describing a sub-listing 408 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 408 according to the protocol is known as "mining." The creation of a new sub-listing 408 may be designed by a "proof of stake" protocol as will be apparent to those skilled in the art upon reviewing the entirety of this disclosure.

Continuing to refer to FIG. 4, in some embodiments, protocol also creates an incentive to mine new sub-listings 408. The incentive may be financial; for instance, successfully mining a new sub-listing 408 may result in the person or entity that mines the sub-listing 408 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 408. Each sub-listing 408 created in immutable sequential listing 400 may contain a record or at least a posted content describing one or more addresses that receive an incentive, such as virtual currency, as the result of successfully mining the sub-listing 408.

With continued reference to FIG. 4, where two entities simultaneously create new sub-listings 408, immutable sequential listing 400 may develop a fork; protocol may determine which of the two alternate branches in the fork is the valid new portion of the immutable sequential listing 400 by evaluating, after a certain amount of time has passed, which branch is longer. "Length" may be measured according to the number of sub-listings 408 in the branch. Length may be measured according to the total computational cost of producing the branch. Protocol may treat only at least a posted content contained in the valid branch as valid at least a posted content. When a branch is found invalid according to this protocol, at least a posted content registered in that branch may be recreated in a new sub-listing 408 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 400 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 400.

Still referring to FIG. 4, additional data linked to at least a posted content may be incorporated in sub-listings 408 in the immutable sequential listing 400; for instance, data may be incorporated in one or more fields recognized by block chain protocols that permit a person or computer forming a at least a posted content to insert additional data in the immutable sequential listing 400. In some embodiments, additional data is incorporated in an unspendable at least a posted content field. For instance, the data may be incorporated in an OP_RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

Figure 5:
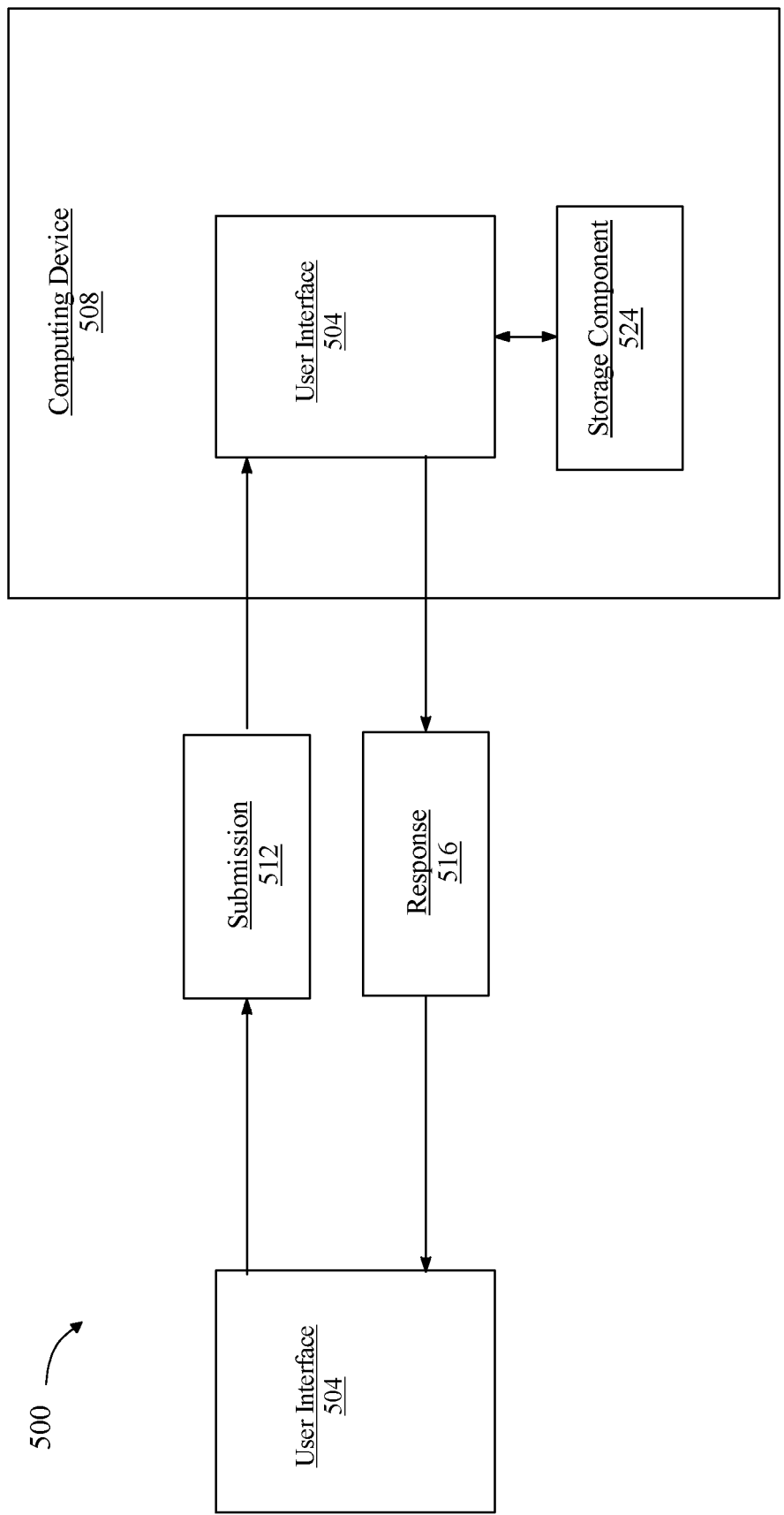
FIG. 5 is a block diagram of an exemplary chatbot system.

Referring to FIG. 5, a chatbot system 500 is schematically illustrated. According to some embodiments, a user interface 504 may be communicative with a computing device 508 that is configured to operate a chatbot. In some cases, user interface 504 may be local to computing device 508. Alternatively or additionally, in some cases, user interface 504 may remote to computing device 508 and communicative with the computing device 508, by way of one or more networks, such as without limitation the internet. Alternatively or additionally, user interface 504 may communicate with user device 508 using telephonic devices and networks, such as without limitation fax machines, short message service (SMS), or multimedia message service (MMS). Commonly, user interface 504 communicates with computing device 508 using text-based communication, for example without limitation using a character encoding protocol, such as American Standard for Information Interchange (ASCII). Typically, a user interface 504 conversationally interfaces a chatbot, by way of at least a submission 512, from the user interface 508 to the chatbot, and a response 516, from the chatbot to the user interface 504. In many cases, one or both of submission 512 and response 516 are text-based communication. Alternatively or additionally, in some cases, one or both of submission 512 and response 516 are audio-based communication.

Continuing in reference to FIG. 5, a submission 512 once received by computing device 508 operating a chatbot, may be processed by a processor 520. In some embodiments, processor 520 processes a submission 5112 using one or more of keyword recognition, pattern matching, and natural language processing. In some embodiments, processor employs real-time learning with evolutionary algorithms. In some cases, processor 520 may retrieve a pre-prepared response from at least a storage component 524, based upon submission 512. Alternatively or additionally, in some embodiments, processor 520 communicates a response 516 without first receiving a submission 512, thereby initiating conversation. In some cases, processor 520 communicates an inquiry to user interface 504; and the processor is configured to process an answer to the inquiry in a following submission 512 from the user interface 504. In some cases, an answer to an inquiry present within a submission 512 from a user device 504 may be used by computing device 104 as an input to another function, for example without limitation at least a feature 108 or at least a preference input 112

Figure 6:
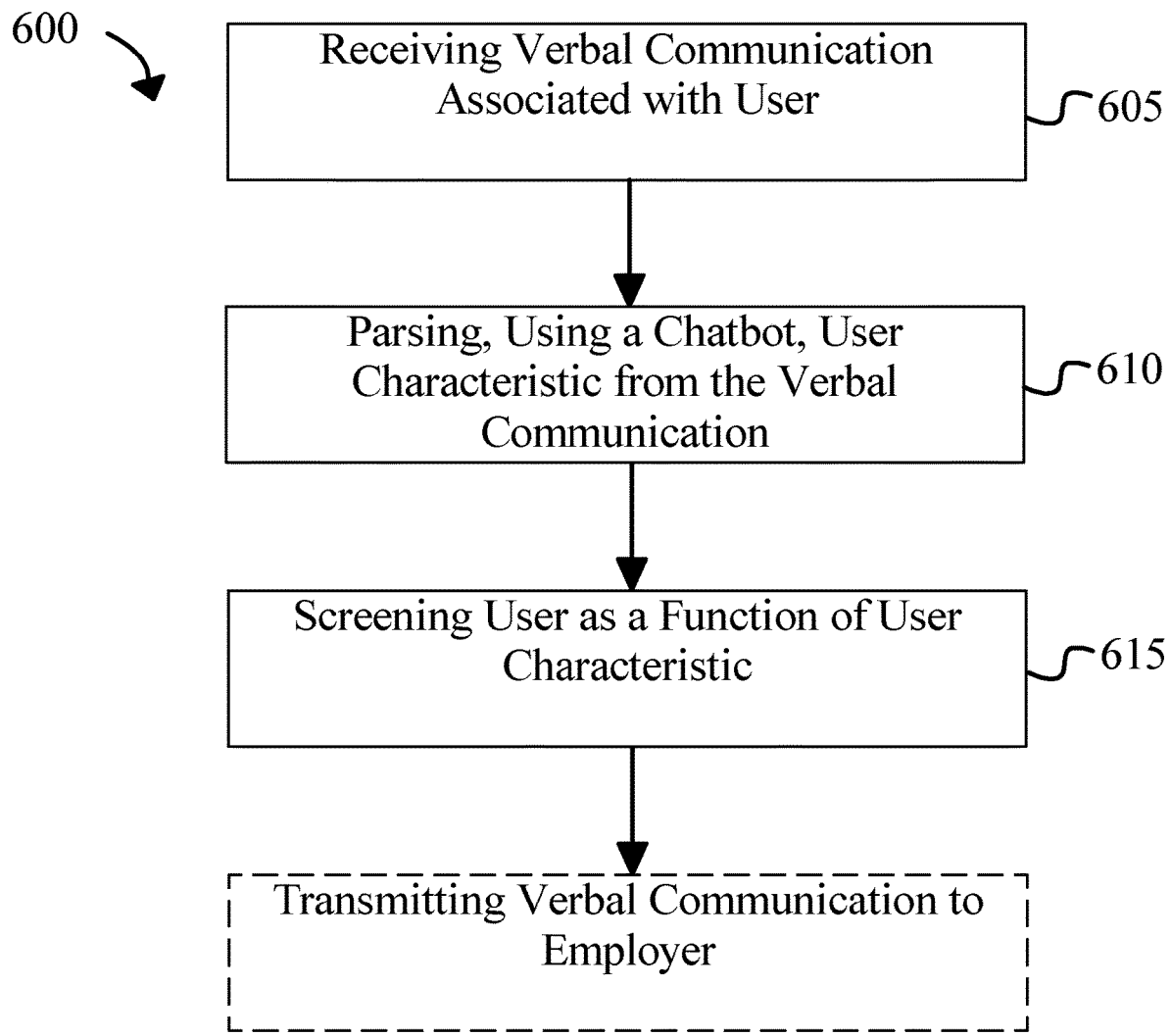
FIG. 6 is a flow diagram of an exemplary method for screening users.

Now referring to FIG. 6, an exemplary embodiment of a method 600 for screening users is illustrated. At step 605, receives verbal communication associated with user; this may be implemented, without limitation, as described above in reference to FIGS. 1-6. Verbal communication may include audio recording of user and/or visual recording of the user.

At step 610, processor parses, using chatbot, at least a user characteristic from verbal communication; this may be implemented, without limitation, as described above in reference to FIGS. 1-6. Chatbot may utilize a machine-learning module. Chatbot may prompt user with request, wherein the request is based on posting.

At step 615, processor screens user as a function of user characteristic; this may be implemented, without limitation, as described above in reference to FIGS. 1-6. Screening user includes generating a compatibility score based on a compatibility of the at least a user characteristic and a posting. Screening user also includes determining confidence score of compatibility score. Compatibility score may be based on a requirement of the posting. Confidence score may be based on an amount of verbal communication. Confidence score may be based on at least a user characteristic. Confidence score may be based on whether processor receives user document. Confidence score may be based on an amount of requirements for criteria of posting. Processor may transmit to employer of posting all verbal communications and/or user documents of users with a threshold compatibility score and/or a threshold confidence score for the posting.

Figure 7:
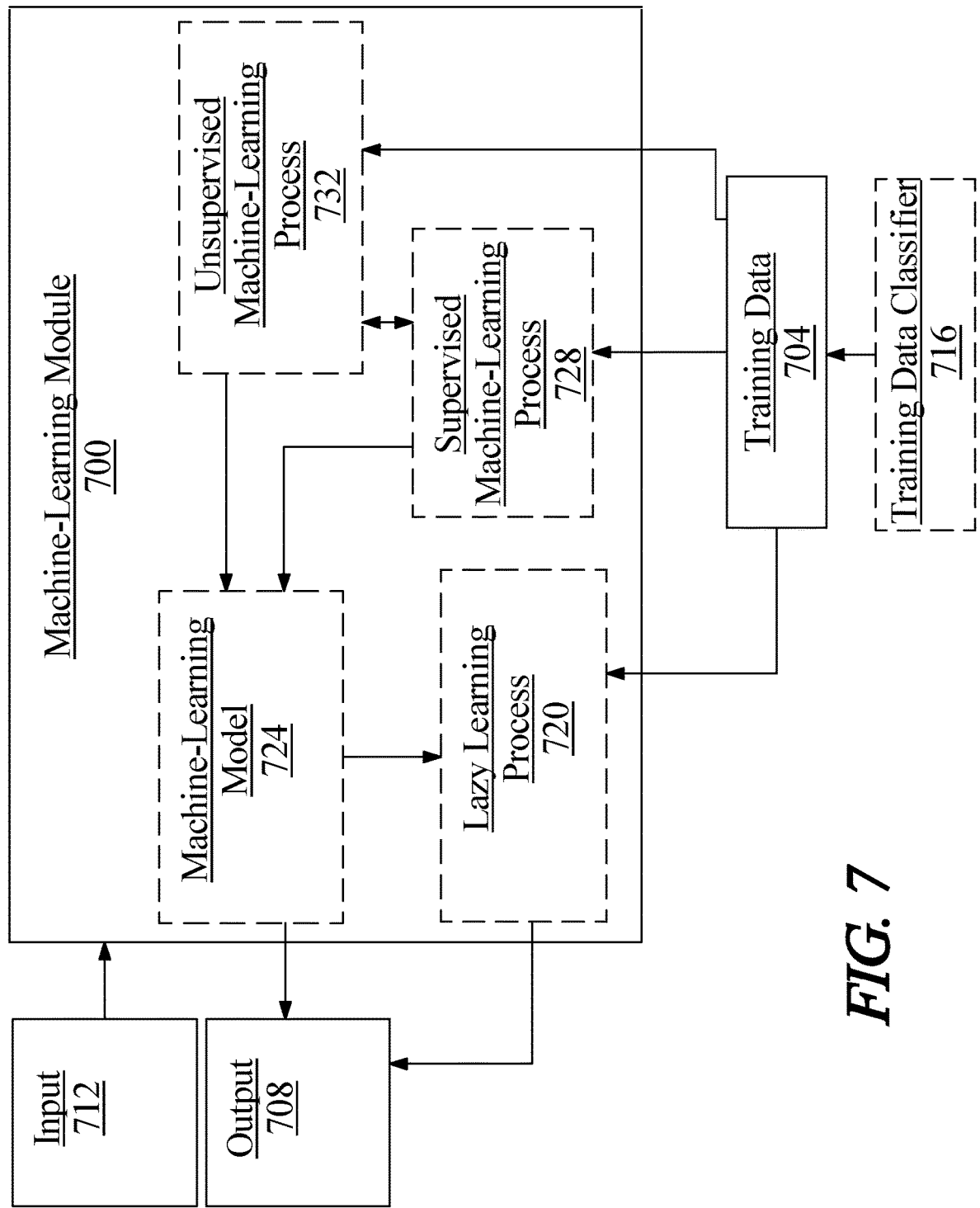
FIG. 7 is a block diagram of exemplary machine-learning processes.

Referring now to FIG. 7, an exemplary embodiment of a machine-learning module 700 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 704 to generate an algorithm that will be performed by a computing device/module to produce outputs 708 given data provided as inputs 712; this is in contrast to a non-machine learning software program where the commands to be executed are determined in advance by a user and written in a programming language.

Still referring to FIG. 7, "training data," as used herein, is data containing correlations that a machine-learning process may use to model relationships between two or more categories of data elements. For instance, and without limitation, training data 704 may include a plurality of data entries, each entry representing a set of data elements that were recorded, received, and/or generated together; data elements may be correlated by shared existence in a given data entry, by proximity in a given data entry, or the like. Multiple data entries in training data 704 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 704 according to various correlations; correlations may indicate causative and/or predictive links between categories of data elements, which may be modeled as relationships such as mathematical relationships by machine-learning processes as described in further detail below. Training data 704 may be formatted and/or organized by categories of data elements, for instance by associating data elements with one or more descriptors corresponding to categories of data elements. As a non-limiting example, training data 704 may include data entered in standardized forms by persons or processes, such that entry of a given data element in a given field in a form may be mapped to one or more descriptors of categories. Elements in training data 704 may be linked to descriptors of categories by tags, tokens, or other data elements; for instance, and without limitation, training data 704 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 7, training data 704 may include one or more elements that are not categorized; that is, training data 704 may not be formatted or contain descriptors for some elements of data. Machine-learning algorithms and/or other processes may sort training data 704 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 704 to be made applicable for two or more distinct machine-learning algorithms as described in further detail below.

Training data 704 used by machine-learning module 700 may correlate any input data as described in this disclosure to any output data as described in this disclosure. As a non-limiting illustrative example, input data may include user information such as user identification, and output data may include one or more sets of user activity data.

Further referring to FIG. 7, training data may be filtered, sorted, and/or selected using one or more supervised and/or unsupervised machine-learning processes and/or models as described in further detail below; such models may include without limitation a training data classifier 716. Training data classifier 716 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 700 may generate a classifier using a classification algorithm, defined as a processes whereby a computing device and/or any module and/or component operating thereon derives a classifier from training data 704. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 716 may classify elements of training data to user and/or user activity data.

Still referring to FIG. 7, machine-learning module 700 may be configured to perform a lazy-learning process 720 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 704. Heuristic may include selecting some number of highest-ranking associations and/or training data 704 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 7, machine-learning processes as described in this disclosure may be used to generate machine-learning models 724. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 724 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 724 may be generated by creating an artificial neural network, such as a convolutional neural network comprising an input layer of nodes, one or more intermediate layers, and an output layer of nodes. Connections between nodes may be created via the process of "training" the network, in which elements from a training data 704 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 7, machine-learning algorithms may include at least a supervised machine-learning process 728. At least a supervised machine-learning process 728, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may user information such as user identification as described above as inputs, one or more sets of user activity data as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 704. Persons skilled in the art, upon reviewing the entirety of this disclosure, will be aware of various possible variations of at least a supervised machine-learning process 728 that may be used to determine relation between inputs and outputs. Supervised machine-learning processes may include classification algorithms as defined above.

Further referring to FIG. 7, machine learning processes may include at least an unsupervised machine-learning processes 732. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 7, machine-learning module 700 may be designed and configured to create a machine-learning model 724 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 7, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
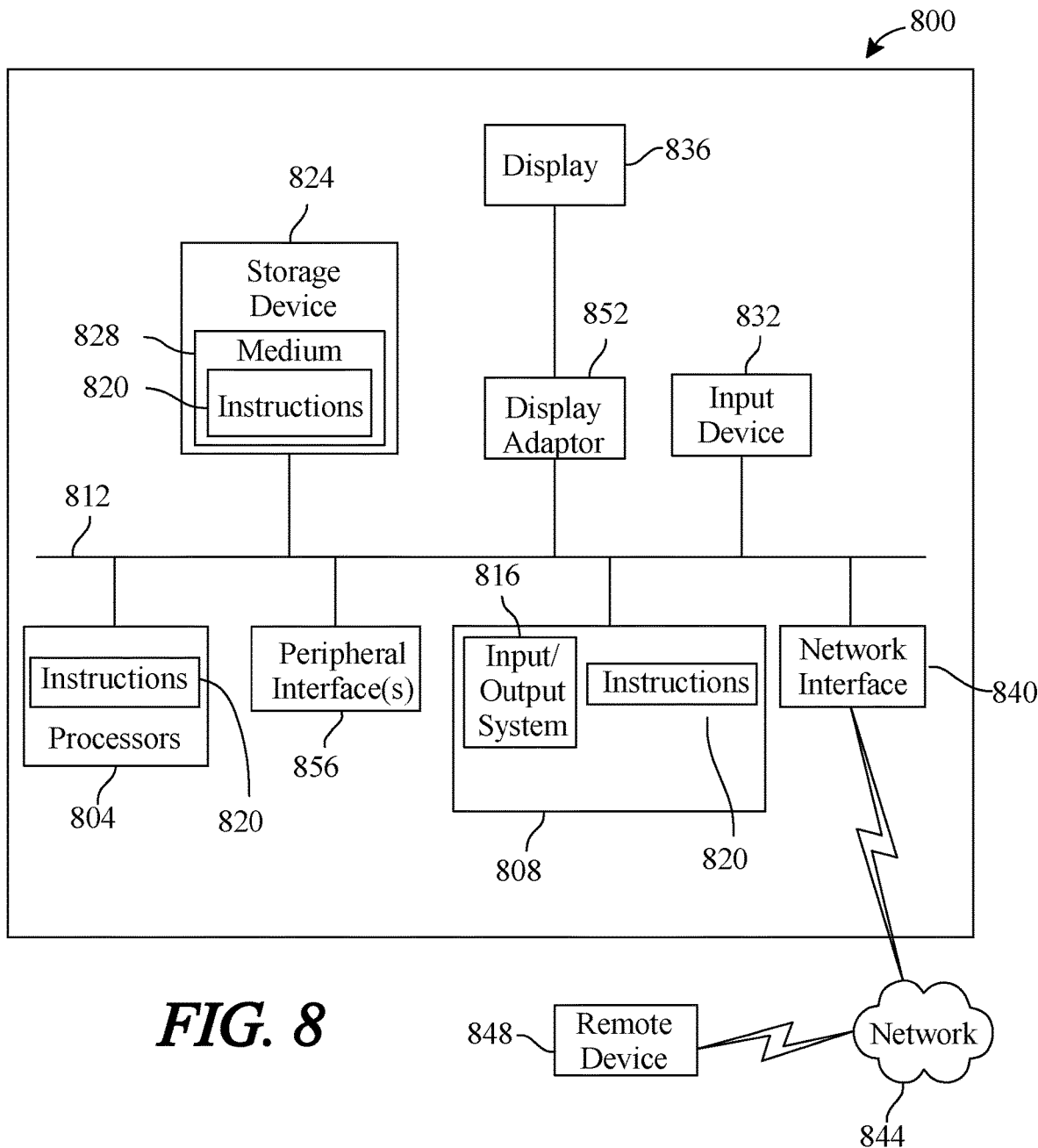
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and apparatus according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for screening users for determining suitable candidates for employment, the apparatus comprising:
   a processor communicatively connected to a user device; and
   a memory communicatively connected to the processor, the memory containing Instructions configuring the processor to:
   verify the user device by sending a verification link to the user device, and receiving verification confirmation from the user device;
   receive, from the user device, a verbal communication and a document associated with a user;
   parse, using a chatbot, at least one user characteristic comprising a keyword from the verbal communication, wherein the keyword is related to education or employment of the user;
   detect an image feature of the document implementing a classifier by comparing the image feature with stored features and choosing a nearest match;
   generate a request to the user, by the chatbot, based on the keyword and the document associated with the user;
   screen the user as a function of the at least one user characteristic and the document, wherein the screening comprises:
      generating a compatibility score based on a compatibility of the at least one user characteristic, the document and a posting Including job criteria;
      determining a confidence score, wherein the confidence score comprises a quantitative value reflecting a confidence in the screening, wherein determining the confidence score comprises:
         training, iteratively a machine learning model of a machine learning module using training data and a machine learning algorithm, wherein the training data includes verbal communication data correlated with confidence score data based on a level of accuracy of the compatibility score and confidence data comprising a length of time of verbal communication, a word count of the verbal communication, and a number of requests to which the user responded;
         updating the training data with input and output results from the trained machine learning model and retraining the machine learning model with the updated training data;
         generating an updated confidence score using the retrained machine learning model, wherein the verbal communication associated with the user and the confidence data is provided as an input to the retrained machine learning model to output the updated confidence score; and
      posting the verbal communication, the document, the compatibility score and the confidence score on an immutable sequential listing or blockchain including a master list comprising a hash-table used to locate a requestor-linked data store, wherein the hash-table is implemented by a hashing algorithm for tamper-proofing.

2. The apparatus of claim 1, wherein the chatbot is configured to prompt the user to respond orally to the request, wherein the chatbot is configured to convert a response to text.

3. The apparatus of claim 2, wherein the verbal communication comprises a visual recording of the user.

4. The apparatus of claim 1, wherein the chatbot, utilizing the machine-learning module, is configured to output the request to the user based on an input of the posting.

5. The apparatus of claim 1, wherein the chatbot, utilizing the machine-learning module, is configured to output the request to the user based on an input of the document.

6. The apparatus of claim 1, wherein the confidence score is based on the at least one user characteristic.

7. The apparatus of claim 1, wherein the confidence score is based on whether the processor receives the document.

8. The apparatus of claim 1, wherein the chatbot prompts the user with the request, wherein the request is based on the posting.

9. The apparatus of claim 1, wherein the confidence score is based on an amount of requirements for criteria of the posting.

10. A method for screening users for determining suitable candidates for employment, the method comprising:
   verifying, by a processor, a user device by sending a verification link to the user device, and receiving verification confirmation from the user device;
   receiving, at the processor, a verbal communication and a document associated with a user from the user device;
   parsing, by the processor using a chatbot, at least one user characteristic comprising a keyword from the verbal communication, wherein the keyword is related to education or employment of the user;
   detecting, by the processor, an image feature of the document implementing a classifier by comparing the image feature with stored features and choosing a nearest match;
   generating, by the processor using the chatbot, a request to the user, based on the keyword and the document associated with the user;
   screening, by the processor, the user as a function of the at least one user characteristic and the document, wherein the screening comprises:
      generating, by the processor, a compatibility score based on a compatibility of the at least one user characteristic, the user document and a posting including job criteria;
      determining, by the processor, a confidence score, wherein the confidence score comprises a quantitative value reflecting a confidence in the screening, wherein determining the confidence score comprises:
         training, iteratively a machine learning model of a machine learning module using training data and a machine learning algorithm, wherein the training data includes verbal communication data correlated with confidence score data based on a level of accuracy of the compatibility score and confidence data comprising a length of time of verbal communication, a word count of the verbal communication, and a number of requests to which the user responded;
         updating the training data with input and output results from the trained machine learning model and retraining the machine learning model with the updated training data;
         generating an updated confidence score using the retrained machine learning model, wherein the verbal communication associated with the user and the confidence data is provided as an input to the retrained machine learning model to output the updated confidence score; and posting the verbal communication, the document, the compatibility score and the confidence score on an immutable sequential listing or blockchain, including a master list comprising a hash-table used to locate a requestor-linked data store, wherein the hash-table is implemented by a hashing algorithm for tamper-proofing.

11. The method of claim 10, wherein the chatbot is configured to prompt the user to respond orally to the request, wherein the chatbot is configured to convert a response to text.

12. The method of claim 11, wherein the verbal communication comprises a visual recording of the user.

13. The method of claim 10, wherein the chatbot, utilizing the machine-learning module, is configured to output the request to the user based on an input of the posting.

14. The method of claim 10, wherein the chatbot, utilizing the machine-learning module, is configured to output the request to the user based on an input of the document.

15. The method of claim 10, wherein the confidence score is based on the at least one user characteristic.

16. The method of claim 10, wherein the confidence score is based on whether the processor receives the document.

17. The method of claim 10, wherein the chatbot prompts the user with the request, wherein the request is based on the posting.

18. The method of claim 10, wherein the confidence score is based on an amount of requirements for criteria of the posting.

\* \* \* \* \*